United States Patent [19]
Saito et al.

[11] Patent Number: 5,577,019
[45] Date of Patent: Nov. 19, 1996

[54] PREPULSE CONDITION/HEAT SHUT OFF CONDITION DETERMINATION METHOD AND APPARATUS FOR OPTICAL RECORDING, AND OPTICAL RECORDING METHOD AND APPARATUS

[75] Inventors: Jun Saito, Tokyo; Shinichi Kurita, Yokohama, both of Japan

[73] Assignee: Nikon Corporation, Tokyo, Japan

[21] Appl. No.: 434,059

[22] Filed: May 3, 1995

Related U.S. Application Data

[62] Division of Ser. No. 141,619, Oct. 27, 1993, abandoned.

[30] Foreign Application Priority Data

Oct. 28, 1992 [JP] Japan .................................. 4-289166
Feb. 16, 1993 [JP] Japan .................................. 5-025901
Sep. 20, 1993 [JP] Japan .................................. 5-232633

[51] Int. Cl.⁶ .................................................. G11B 7/125
[52] U.S. Cl. ........................................... 369/116; 369/13
[58] Field of Search ............................ 369/106, 13, 116, 369/54.59

[56] References Cited

U.S. PATENT DOCUMENTS

| | | | |
|---|---|---|---|
| 5,430,696 | 7/1995 | Tokita et al. | 369/116 |
| 5,457,666 | 10/1995 | Toda et al. | 369/116 |
| 5,463,600 | 10/1995 | Kirino et al. | 369/13 |
| 5,487,059 | 1/1996 | Saito et al. | 369/116 |

FOREIGN PATENT DOCUMENTS

| | | |
|---|---|---|
| 0405610 | 1/1991 | European Pat. Off. . |
| 0431185 | 6/1991 | European Pat. Off. . |
| 0446892 | 9/1991 | European Pat. Off. . |

OTHER PUBLICATIONS

Aoki et al., "Magnetooptical Memory of High Rate and High Density (Preemphasis)," *IEE Translation Journal on Magnetics in Japan*, vol. 3, No. 7, Jul. 1988, pp. 541–542.

Primary Examiner—Georgia Y. Epps
Assistant Examiner—Kim-Kwok Chu
Attorney, Agent, or Firm—Shapiro and Shapiro

[57] ABSTRACT

In an optical recording method and apparatus, the intensity of a laser beam to be radiated onto an optical recording medium is raised from an intensity $P_{pre}$ for maintaining a pre-heat state, in which the temperature of the medium surface becomes a predetermined temperature, to an intensity $P_{W1}$ higher than $P_{pre}$, and after $P_{W1}$ is maintained for a time $T_{W1}$, the intensity is reduced to an intensity $P_{W2}$ lower than $P_{W1}$ to form a mark on the optical recording medium. $P_{W2}$ is controlled so that the medium temperature at a peak temperature position or a spot center position of the laser beam radiated onto the medium surface after an elapse of the time $T_{W1}$ becomes constant even after the intensity is reduced to $P_{W2}$, and at least one of $P_{pre}$, $T_{off}$, and $P_{LB}$ is controlled to establish the pre-heat condition within a time period until the intensity is raised to $P_{W1}$ again so as to form the next mark.

11 Claims, 11 Drawing Sheets

PREPULSE CONDITION/HEAT SHUT OFF CONDITION DETERMINATION METHOD AND APPARATUS FOR OPTICAL RECORDING, AND OPTICAL RECORDING METHOD AND APPARATUS

This is a division of application Ser. No. 08/141,619 filed Oct. 27, 1993, now abandoned.

BACKGROUND OF THE INVENTION

1. Field of the Invention

The present invention relates to a prepulse condition/heat shut off condition determination method and apparatus for optical recording, and an optical recording method and apparatus.

2. Related Background Art

At present, optical recording is achieved by exclusively utilizing a thermal nature of a laser beam, and recording media (optical disks) include (1) a write-once type optical disk (pit formation type) allowing recording only once, such as an optical disk having a thin metallic film or thermet film as a recording layer, and (2) an optical disk which allows repeated recording, reproduction, and erasure, such as a magnetooptical disk having a magnetic thin film as a recording layer, a phase-change optical disk having a metallic film or thermet film as a recording layer, which film causes a phase change between crystal and amorphous phases, and the like.

Several ten thousands of tracks on which information is to be recorded are spirally or concentrically formed on an optical disk. Two types of information units corresponding to "0" and "1" are formed on each track, thereby recording information. In practice, the track itself (i.e., a background portion) indicates a first information unit corresponding to one of "0" and "1", and second information units (called marks, recently) corresponding to the other one of "0" and "1" are formed on the track in a point or island pattern. In this case, the presence/absence of marks, the mark interval, the mark length, the mark formation start position (i.e., the leading edge position of a mark), the mark formation end position (i.e., the trailing edge position of a mark), and the like express information. In particular, a method of expressing information by the edge position of a mark is called mark length recording.

An optical recording apparatus is mainly constituted by a laser source, a radiation optical system for radiating a laser beam emitted from the laser source onto an optical disk, modulation means for modulating the laser beam intensity according to information to be recorded, and optical disk rotation means. In a magnetooptical recording apparatus, magnetic means for applying a bias magnetic field to the radiation position of the beam is added.

The method for performing recording on an optical disk based on mark length recording includes a digital recording method and an analog recording method.

In general, digital recording is a method of performing recording using several types of fixed length marks determined by a modulation method. For example, when one seven RLL (Run Length Limited) modulation coding is used, the number of types of marks is 7 (2T to 8T; T is the write clock).

Figure 12:
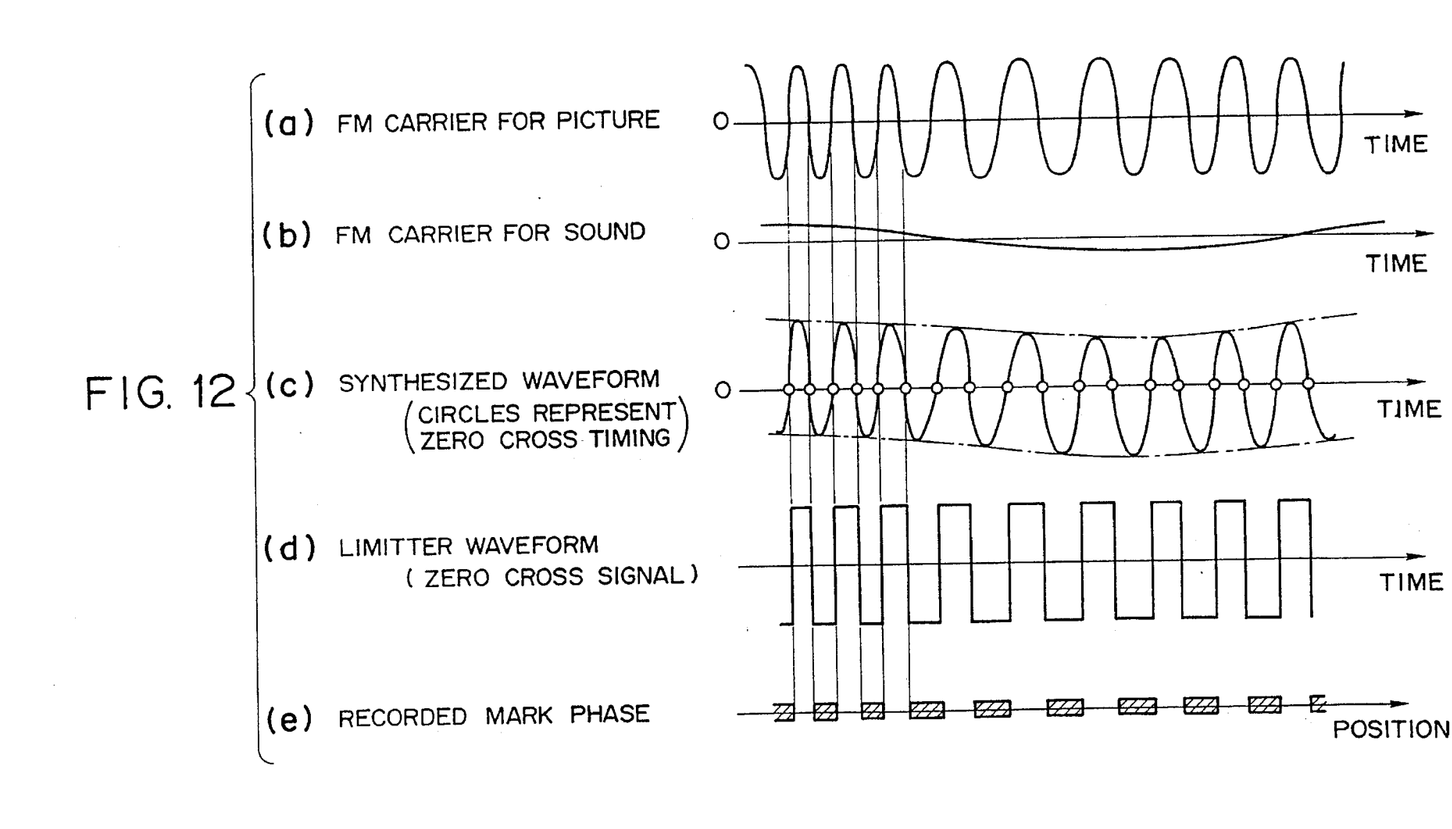
FIGS. 12(a)–12(e) are explanatory views showing the relationship between signal waveforms and marks to be recorded.

In contrast, in analog recording, mark lengths and mark intervals are arbitrary. The analog recording is mainly used for recording picture and sound signals, and is performed in the following process. First, a picture carrier obtained by frequency-modulating a picture signal and a sound carrier obtained by frequency-modulating a sound signal are added at a predetermined amplitude ratio. The synthesized signal is binarized by a certain threshold level to be converted into two types of information units corresponding to "0" and "1". Either of "0" or "1" is recorded on an optical disk as a mark. This recording process is shown in FIG. 12. In this case, the mark length represents information of the picture signal, and the duty (the ratio of the mark length to the mark period) represents information of the sound signal.

The same principle of optical recording applies to both the digital and analog methods. The principle will be described below.

Since optical recording exclusively utilizes a thermal nature of a laser beam (heat mode), the laser beam intensity need only be pulse-modulated between a relatively high first level and a relatively low base level (second level) in principle. When the laser beam intensity is at the first level, a mark is formed; when it is at the second level, no mark is formed. That is, one mark is formed in correspondence with one pulse. The second level can be zero since it does not form any mark. However, when a mark is to be formed, in other words, when the leading edge of a mark is to be formed, it is preferable that the disk temperature state immediately before formation be always positively maintained in a constant temperature state. Otherwise, the leading edge position varies depending on the temperature state immediately before formation. Such a variation disturbs high-density recording. Thus, it is preferable that an optical disk be pre-heated to a predetermined temperature $\Theta_{pre}$, i.e., be set in a pre-heat state, and the second level be normally set at an intensity $P_{pre}$ for maintaining this pre-heat state (temperature $\Theta_{pre}$). The temperature $\Theta_{pre}$ allows the disk temperature immediately before mark formation to be constant independently of the peak temperature position of the beam or the data pattern recorded at the spot center position, and $P_{pre}$ is given by the following formula:

$$\Theta_{pre} = A \times P_{pre} \times \{1 - \exp(-\infty/\tau)\} + \Theta A \qquad \text{formula (3)}$$

where A (°C./mW) is the heat efficiency of the laser beam intensity determined by the disk, the spot, and the recording line density, and $\Theta A$ (°C.) is the disk temperature in a non-radiation state of the beam.

Figure 8:
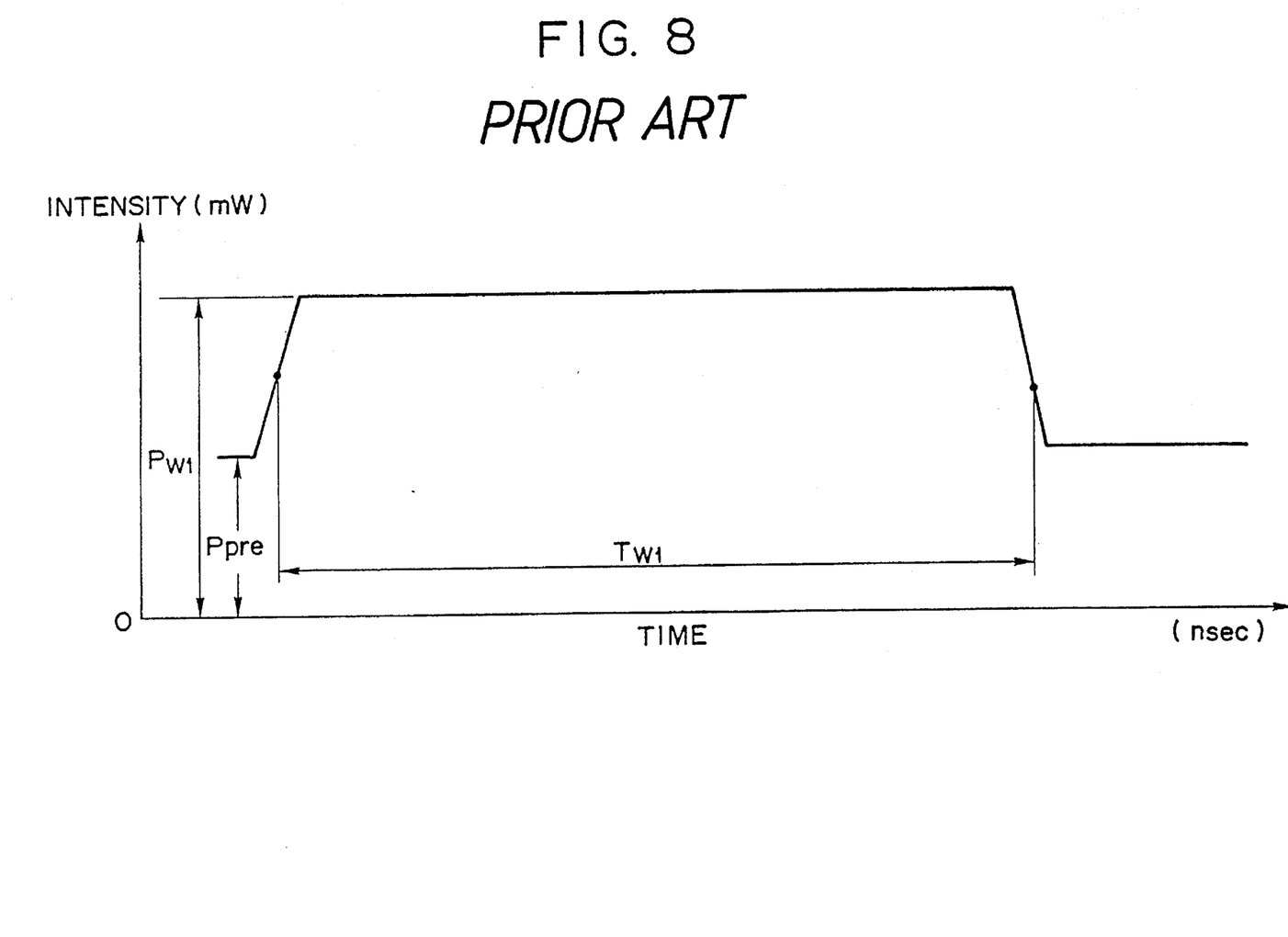
FIG. 8 is a waveform chart of a laser beam intensity when one mark is formed by a conventional method.

The first mark formation is a method of forming one mark in correspondence with one pulse. FIG. 8 is a waveform chart of the laser beam intensity when one mark is formed by the first method. As shown in FIG. 8, a pulse waveform for raising the laser beam intensity from the base level (second level) $P_{pre}$ to start mark formation, and after the raised intensity (first level) $P_{W1}$ is maintained for a time $T_{W1}$ by a half-width, reducing the intensity to $P_{pre}$ is used. In this case, when the mark length is large, an adverse effect due to heat accumulation appears. The adverse effect is that even when the laser beam intensity is reduced to $P_{pre}$ to end mark formation, the medium temperature cannot be easily decreased to the mark formation start temperature or less due to the heat accumulation so far. For this reason, the mark length or width becomes undesirably large. This adverse effect is called "recording data pattern dependency of the mark formation end position, i.e., the mark trailing edge position". This dependency disturbs high-density recording.

Figure 9:
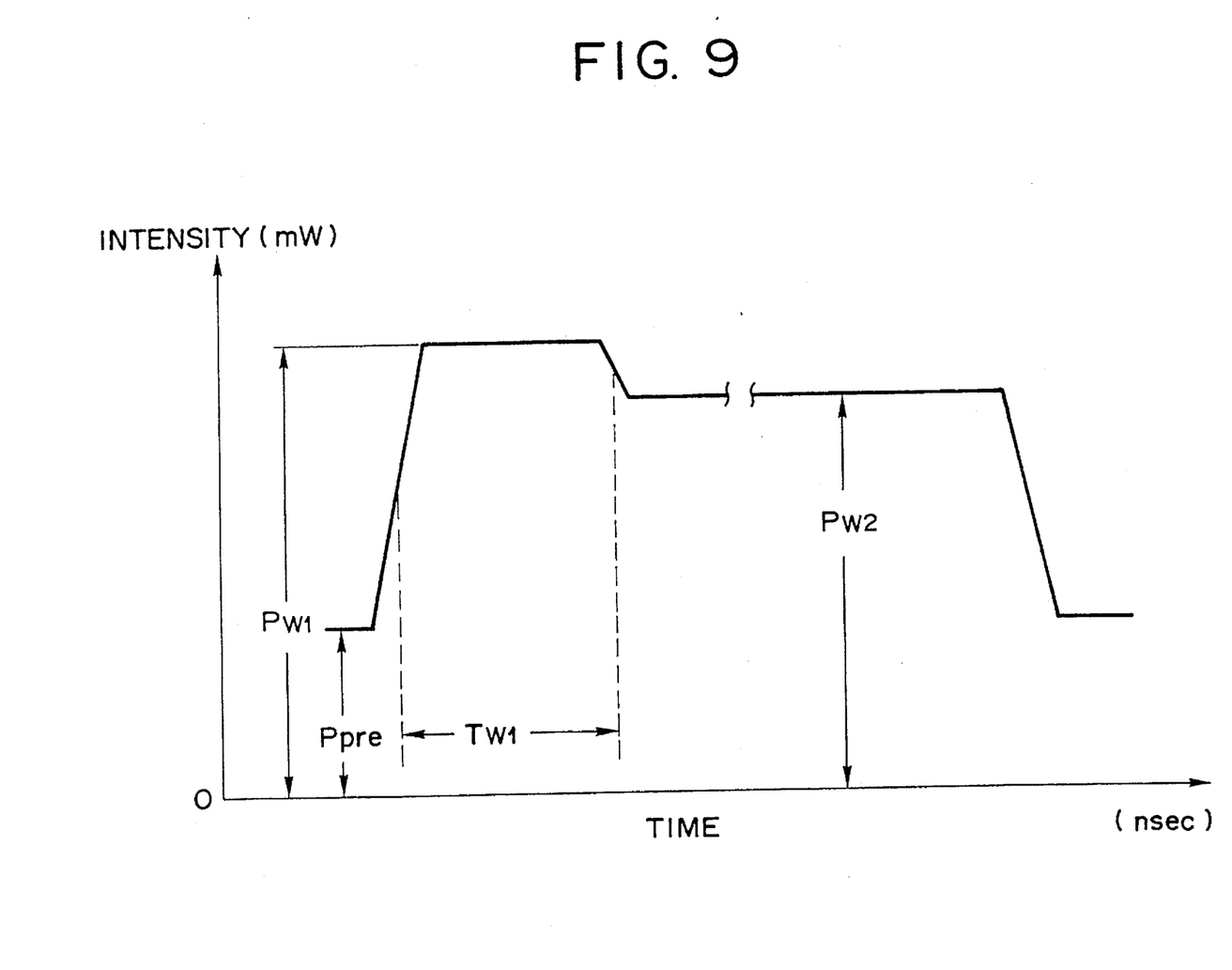
FIG. 9 is a waveform chart of a laser beam intensity when one mark is formed by a prepulse method.

The second mark formation method can solve this problem to some extent. FIG. 9 is a waveform chart of the laser beam intensity when one mark is formed by the second method. In this method, in order to form a mark, the intensity of the laser beam is raised from $P_{pre}$ to an intensity $P_{W1}$ higher than $P_{pre}$, the intensity is reduced to an intensity $P_{W2}$ lower than $P_{W1}$ after $P_{W1}$ is maintained for a time $T_{W1}$ by a half-width, and the intensity is reduced to $P_{pre}$ to end mark formation after $P_{W2}$ is maintained for a predetermined period of time. This method is especially called a prepulse method.

In the prepulse method, $P_{W1}$, $T_{W1}$, and $P_{W2}$ are called a prepulse condition. Conventionally, the prepulse condition is determined based on experience, and is fixed irrespective of the types of optical disks and individual disks.

Under the conventional fixed prepulse condition, it is difficult to minimize "recording data pattern dependency of the mark trailing edge position". More specifically, a mark has a teardrop shape having a larger trailing end portion, or conversely, has a teardrop shape having a larger leading end portion. Therefore, in the case of high-density recording, the trailing edge of the mark cannot be recorded at a precise position in some optical disks to be used. In particular, in the analog recording method using an arbitrary mark length, this problem is conspicuous. It is an object of the present invention to solve this problem.

SUMMARY OF THE INVENTION

According to the extensive studies of the present inventors, it was found that the above-mentioned problems are caused by the fixed prepulse condition irrespective of optical disks, and an optimal prepulse condition is not applied to some optical disks. As a result of further extensive studies, the present inventors found that a thermal time constant $\tau$ varies in units of optical disks, and invented a method and apparatus for determining an optimal prepulse condition in consideration of $\tau$. Also, the present inventors invented a method and apparatus for executing optical recording using the determined prepulse condition.

Figure 10:
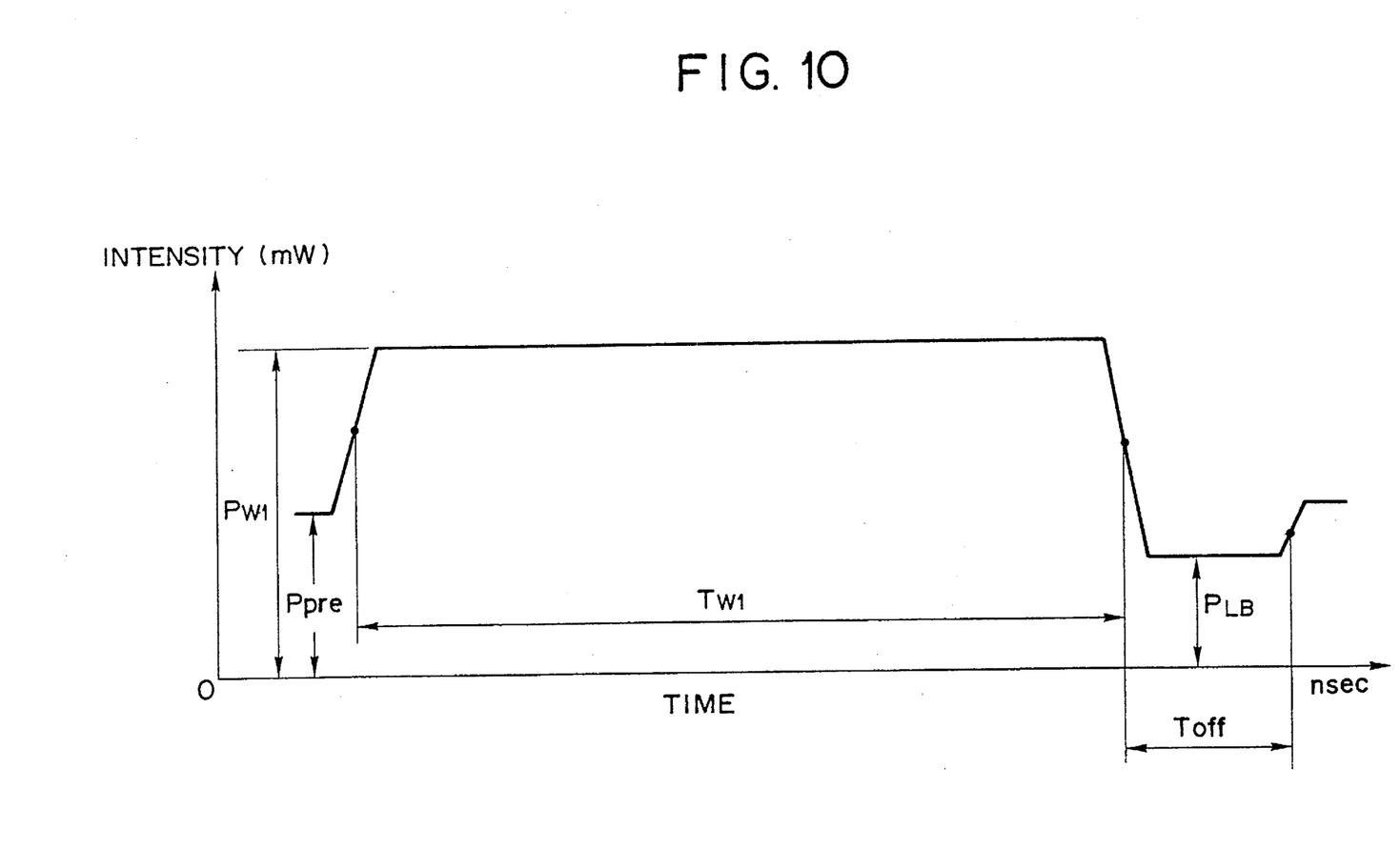
FIG. 10 is a waveform chart of a laser beam intensity when one mark is formed using a heat shut off method and the prepulse method.
Figure 11:
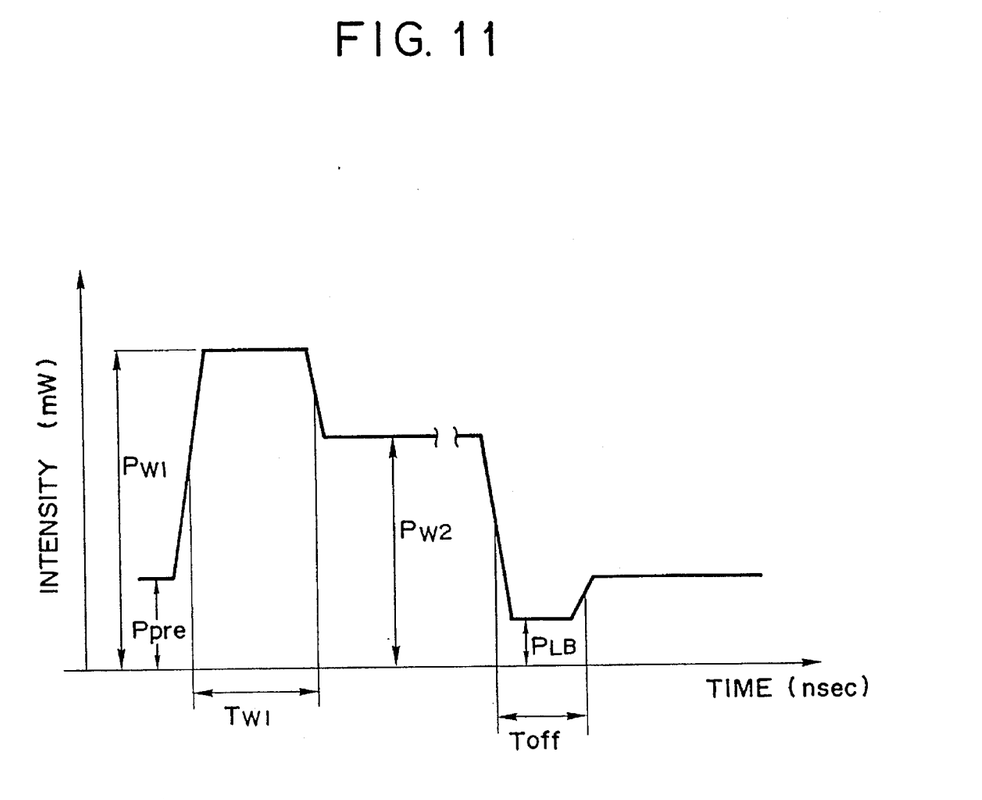
FIG. 11 is a waveform chart of a laser beam intensity when one mark is formed using the prepulse method.

On the other hand, in the case of high-density recording, the start position of the next mark undesirably varies depending on the end position of the immediately preceding mark. This phenomenon is called "recording data pattern dependency of the mark formation start position, i.e., the mark leading edge position". In order to solve this problem, an optical recording method for, when the laser beam intensity is reduced to end mark formation, temporarily reducing the intensity to $P_{LB}$ lower than $P_{pre}$, and after an elapse of a time $T_{off}$, raising the intensity to $P_{pre}$ has been proposed. FIGS. 10 and 11 are waveform charts of the laser beam intensity when one mark is formed by this method. FIG. 10 shows a case wherein one mark is formed in correspondence with one pulse, and FIG. 11 shows a case wherein a mark is formed by the prepulse method. In the latter method, formation of the next mark is started from a predetermined position regardless of the length of the immediately preceding mark. In this manner, a thermal influence from the immediately preceding mark is shut off for the next mark. A condition for shutting off the thermal influence in this manner is called a "heat shut off condition", and is expressed by $P_{pre}$, $P_{LB}$, and $T_{off}$.

When the laser beam intensity decreases from $P_{W1}$ or $P_{W2}$, and reaches $P_{pre}$ via $P_{LB}$, the temperature of an optical disk decreases from a high temperature (to be referred to as $\Theta_{top}$ hereinafter) capable of performing mark formation, and then becomes constant at the temperature $\Theta_{pre}$ in the pre-heat state. In this case, there are two types of decreased temperature profiles.

In the first decreased temperature profile, the temperature monotonously decreases from $\Theta_{top}$ to $\Theta_{pre}$, and becomes constant. In the second decreased temperature profile, the temperature decreases from $\Theta_{top}$ to a temperature below $\Theta_{pre}$ temporarily, then increases from the temperature below $\Theta_{pre}$ to $\Theta_{pre}$, and then becomes constant. In either profile, the start position of the next mark formation, i.e., the leading edge position of the next mark cannot be formed at a desired position unless the temperature of the optical disk is constant at $\Theta_{pre}$. In either profile, a time from when the temperature decreases from $\Theta_{top}$ until it becomes constant at $\Theta_{pre}$ will be referred to as $T_{tc}$ hereinafter.

When the next mark is formed before an elapse of the time $T_{tc}$ so as to increase the recording density, the leading edge position of the next mark undesirably has recording data pattern dependency. Thus, after an elapse of the time $T_{tc}$, the next mark is formed. In this case, if the time $T_{tc}$ is long, the interval to the next mark increases, and the recording density becomes low.

Figure 13:
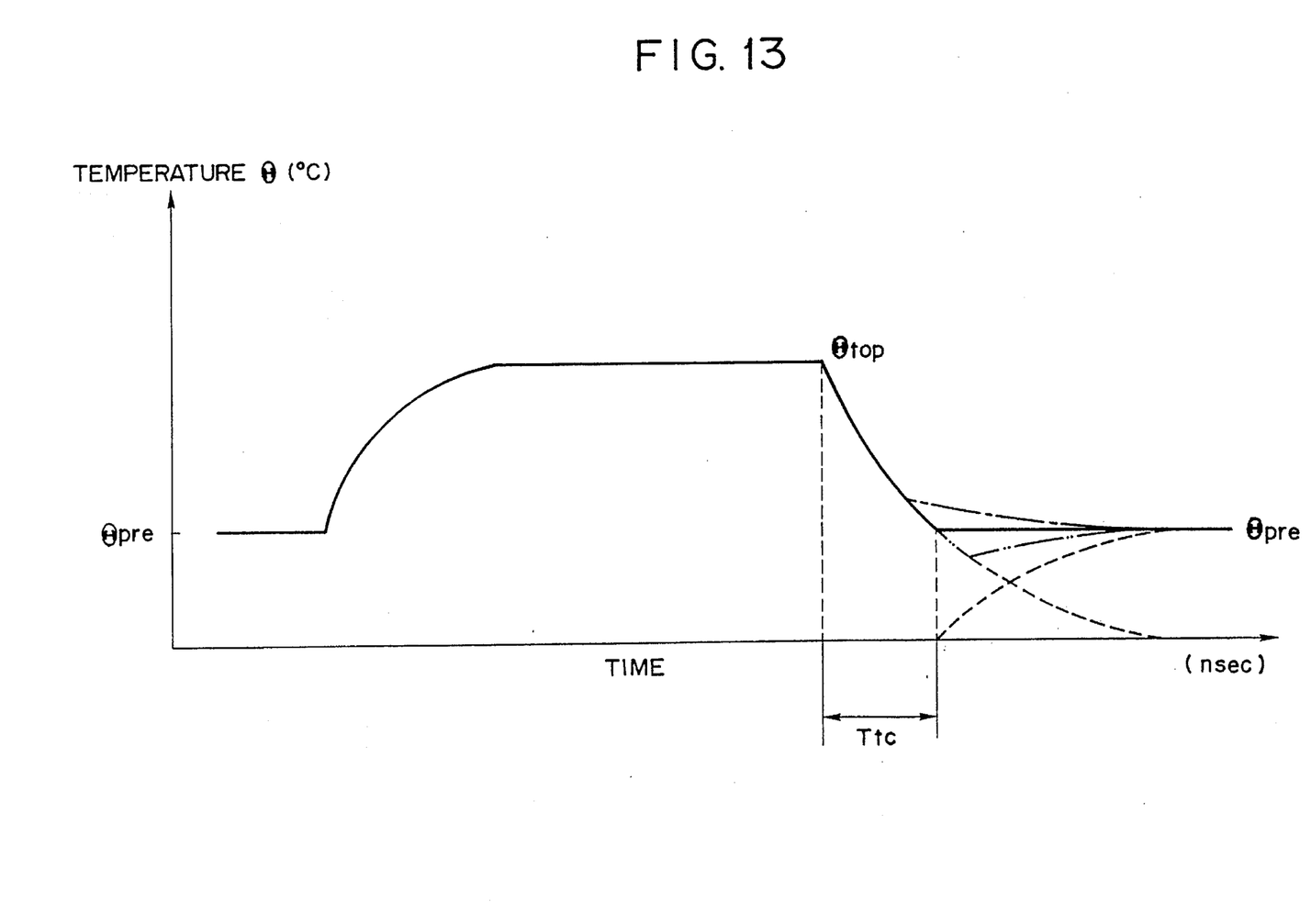
FIG. 13 is a graph of a change in temperature at the spot center of the laser beam or a change in peak temperature as time elapses when a mark is formed by the prepulse method and the heat shut off method.

A condition for shortening $T_{tc}$ can be considered as a heat shut off condition. FIG. 13 is a graph showing a change in temperature of the spot center of the laser beam or a change in peak temperature as time elapses when a mark is formed by the prepulse method and the heat shut off method. Under an insufficient heat shut off condition, a decreased temperature profile indicated by a one dash line in FIG. 13 is obtained, resulting in long $T_{tc}$. Under an excessive heat shut off condition, a decreased temperature profile indicated by a two dash line in FIG. 13 is obtained, resulting in long $T_{tc}$ as well. Under an optimal heat shut off condition, a decreased temperature profile indicated by a full line in FIG. 13 is obtained, resulting in a shortest $T_{tc}$. When recording is performed by the prepulse method, the disk temperature state immediately before formation must be positively kept constant at the beginning of writing of a mark, i.e., upon formation of the leading edge of a mark. As a method of realizing this, the above-mentioned heat shut off method is very effective. Therefore, the prepulse method is preferably used in combination with the heat shut off method.

Under the heat shut off condition with $P_{LB}=0$ in formula (2), $T_{tc}$ shown in FIG. 13 becomes minimum as an absolute value. Therefore, $P_{LB}$ is preferably set to be zero. Also, $T_{off}$ is preferably set to be equal to or close to a value m/n times (m and n are natural numbers) of a write clock period T.

According to the first aspect of the invention, there is provided an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, and after $P_{W1}$ is maintained for a time $T_{W1}$, the intensity is reduced to an intensity $P_{W2}$ lower than $P_{W1}$ to form a mark on the optical recording medium, wherein $P_{W2}$ is controlled so that the medium temperature at a peak temperature position or a spot center position of the laser beam radiated onto the medium surface after an elapse of the time $T_{W1}$ becomes constant even after the intensity is reduced to $P_{W2}$.

According to the second aspect of the invention, there is provided an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, and after $P_{W1}$ is maintained for a time $T_{W1}$, the intensity is reduced to an intensity $P_{W2}$ lower than $P_{W1}$ to form a mark on the optical recording medium, wherein the respective values are determined as a combination for satisfying the following formula (1):

$$P_{W2} - P_{pre} = (P_{W1} - P_{pre}) \times \{1 - \exp(-T_{W1}/\tau)\} \quad \text{formula (1)}$$

where $\tau$ is the thermal time constant of the optical recording medium.

According to the third aspect of the invention, there is provided an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{W2}$ lower than $P_{W1}$ to form a mark on the optical recording medium, thereafter, the intensity is reduced to an intensity $P_{LB}$ lower than $P_{pre}$, and after an lapse of a time $T_{off}$, the intensity is raised to $P_{pre}$, wherein $P_{W2}$ is controlled so that the medium temperature at a peak temperature position or a spot center position of the laser beam radiated onto the medium surface after an elapse of the time $T_{W1}$ becomes constant even after the intensity is reduced to $P_{W2}$, and at least one of $P_{pre}$, $T_{off}$, and $P_{LB}$ is controlled to establish the pre-heat condition within a time period until the intensity is raised to $P_{W1}$ again so as to form the next mark.

According to the fourth aspect of the invention, there is provided an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{W2}$ lower than $P_{W1}$ to form a mark on the optical recording medium, thereafter, the intensity is reduced to an intensity $P_{LB}$ lower than $P_{pre}$, and after an lapse of a time $T_{off}$, the intensity is raised to $P_{pre}$, wherein the respective values are determined as a combination for satisfying formula (1) and the following formula (2):

$$T_{off} = \tau \times \ln\left[\{(P_{W1} - P_{LB}) - (P_{W1} - P_{pre}) \times \exp(-T_{W1}/\tau)\} \div (P_{pre} - P_{LB})\right] \quad \text{formula (2)}$$

where $\tau$ is the thermal time constant of the optical recording medium.

According to the fifth aspect of the invention, thermal response characteristics of the optical recording medium are approximated by an exponential function in the method according to the first or third aspect of the invention.

According to the sixth aspect of the invention, the intensity $P_{LB}$ is set to be zero in the method according to the third or fourth aspect of the invention.

According to the seventh aspect of the invention, the time $T_{off}$ is set to be equal to or close to a value m/n times (m and n are natural numbers) of a write clock period T in the method according to the third or fourth aspect of the invention.

According to the eighth aspect of the invention, there is provided an optical recording apparatus comprising: a laser source for emitting a laser beam; radiation means for radiating the laser beam onto an optical recording medium; moving means for changing a radiation position of the laser beam on the recording medium; modulation means for raising an intensity of the laser beam to be radiated onto the optical recording medium from an intensity $P_{pre}$ for maintaining a pre-heat state, in which a temperature of the medium surface becomes a predetermined temperature, to an intensity $P_{W1}$ higher than $P_{pre}$, and reducing the intensity to an intensity $P_{W2}$ lower than $P_{W1}$ after $P_{W1}$ is maintained for a time $T_{W1}$; and control means for controlling $P_{W2}$ so that the medium temperature at a peak temperature position or a spot center position of the laser beam radiated onto the medium surface after an elapse of the time $T_{W1}$ becomes constant even after the intensity is reduced to $P_{W2}$.

According to the ninth aspect of the invention, there is provided an optical recording apparatus comprising: a laser source for emitting a laser beam; radiation means for radiating the laser beam onto an optical recording medium; moving means for changing a radiation position of the laser beam on the recording medium; modulation means for raising an intensity of the laser beam to be radiated onto the optical recording medium from an intensity $P_{pre}$ for maintaining a pre-heat state, in which a temperature of the medium surface becomes a predetermined temperature, to an intensity $P_{W1}$ higher than $P_{pre}$, and reducing the intensity to an intensity $P_{W2}$ lower than $P_{W1}$ after $P_{W1}$ is maintained for a time $T_{W1}$; and condition determination means for determining the respective values as a combination for satisfying formula (1).

According to the 10th aspect of the invention, there is provided an optical recording apparatus comprising: a laser source for emitting a laser beam; radiation means for radiating the laser beam onto an optical recording medium; moving means for changing a radiation position of the laser beam on the recording medium; first modulation means for raising an intensity of the laser beam to be radiated onto the optical recording medium from an intensity $P_{pre}$ for maintaining a pre-heat state, in which a temperature of the medium surface becomes a predetermined temperature, to an intensity $P_{W1}$ higher than $P_{pre}$, and reducing the intensity to an intensity $P_{W2}$ lower than $P_{W1}$ after $P_{W1}$ is maintained for a time $T_{W1}$ so as to form a mark; second modulation means for reducing the intensity to an intensity $P_{LB}$ lower than $P_{pre}$ after the mark is formed on the optical recording medium, and raising the intensity to $P_{pre}$ after an elapse of a time $T_{off}$; first control means for controlling $P_{W2}$ so that the medium temperature at a peak temperature position or a spot center position of the laser beam radiated onto the medium surface after an elapse of the time $T_{W1}$ becomes constant even after the intensity is reduced to $P_{W2}$; and second control means for controlling at least one of $P_{pre}$, $T_{off}$, and $P_{LB}$ so as to establish the pre-heat state within a time period until the intensity is raised to $P_{W1}$ again so as to form the next mark.

According to the 11th aspect of the invention, there is provided an optical recording apparatus comprising: a laser source for emitting a laser beam; radiation means for radiating the laser beam onto an optical recording medium; moving means for changing a radiation position of the laser beam on the recording medium; first modulation means for raising an intensity of the laser beam to be radiated onto the optical recording medium from an intensity $P_{pre}$ for maintaining a pre-heat state, in which a temperature of the medium surface becomes a predetermined temperature, to an intensity $P_{W1}$ higher than $P_{pre}$, and reducing the intensity to an intensity $P_{W2}$ lower than $P_{W1}$ after $P_{W1}$ is maintained for a time $T_{W1}$ so as to form a mark; second modulation means for reducing the intensity to an intensity $P_{LB}$ lower than $P_{pre}$ after the mark is formed on the optical recording medium, and raising the intensity to $P_{pre}$ after an elapse of a time $T_{off}$; and condition determination means for determining the respective values as a combination for satisfying formulas (1) and (2).

According to the 12th aspect of the invention, the intensity $P_{LB}$ is set to be zero in the apparatus according to the 10th or 11th aspect of the invention.

According to the 13th aspect of the invention, the time $T_{off}$ is set to be equal to or close to a value m/n times (m and n are natural numbers) of a write clock period T in the apparatus according to the 10th or 11th aspect of the invention.

According to the 14th aspect of the invention, there is provided in a method of determining a condition for an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, and after $P_{W1}$ is maintained for a time $T_{W1}$, the intensity is reduced to an intensity $P_{W2}$ lower than $P_{W1}$ to form a mark on the optical recording medium, a method of determining a prepulse condition for optical recording, wherein $P_{W2}$ is set so that the medium temperature at a peak temperature position or a spot center position of the laser beam radiated onto the medium surface after an elapse of the time $T_{W1}$ becomes constant even after the intensity is reduced to $P_{W2}$.

According to the 15th aspect of the invention, there is provided in a method of determining a condition for an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, and after $P_{W1}$ is maintained for a time $T_{W1}$, the intensity is reduced to an intensity $P_{W2}$ lower than $P_{W1}$ to form a mark on the optical recording medium, a method of determining a prepulse condition for optical recording, wherein the respective values are determined as a combination for satisfying formula (1).

According to the 16th aspect of the invention, there is provided in a method of determining a condition for an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{W2}$ lower than $P_{W1}$ to form a mark on the optical recording medium, thereafter, the intensity is reduced to an intensity $P_{LB}$ lower than $P_{pre}$, and after an lapse of a time $T_{off}$, the intensity is raised to $P_{pre}$, a method of determining a prepulse condition and a heat shut off condition for optical recording, wherein $P_{W2}$ is set so that the medium temperature at a peak temperature position or a spot center position of the laser beam radiated onto the medium surface after an elapse of the time $T_{W1}$ becomes constant even after the intensity is reduced to $P_{W2}$, and a combination of $P_{pre}$, $T_{off}$ and $P_{LB}$, which combination establishes the pre-heat condition within a time period until the intensity is raised to $P_{W1}$ again so as to form the next mark, is determined.

According to the 17th aspect of the invention, there is provided in a method of determining a condition for an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{W2}$ lower than $P_{W1}$ to form a mark on the optical recording medium, thereafter, the intensity is reduced to an intensity $P_{LB}$ lower than $P_{pre}$, and after an lapse of a time $T_{off}$, the intensity is raised to $P_{pre}$, a method of determining a prepulse condition and a heat shut off condition for optical recording, wherein the respective values are determined as a combination for satisfying formulas (1) and (2).

According to the 18th aspect of the invention, the intensity $P_{LB}$ is set to be zero in the method according to the 16th or 17th aspect of the invention.

According to the 19th aspect of the invention, the time $T_{off}$ is set to be equal to or close to a value m/n times (m and n are natural numbers) of a write clock period T in the method according to the 16th or 17th aspect of the invention.

According to the 20th aspect of the invention, there is provided in an apparatus for determining a condition for an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, and after $P_{W1}$ is maintained for a time $T_{W1}$, the intensity is reduced to an intensity $P_{W2}$ lower than $P_{W1}$ to form a mark on the optical recording medium, an apparatus for determining a prepulse condition for optical recording, comprising: a calculation unit for calculating $P_{W2}$, which allows the medium temperature at a peak temperature position or a spot center position of the laser beam radiated onto the medium surface after an elapse of the time $T_{W1}$ to become constant even after the intensity is reduced to $P_{W2}$; and an output unit for outputting a value calculated by the calculation unit.

According to the 21st aspect of the invention, there is provided in an apparatus for determining a condition for an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, and after $P_{W1}$ is maintained for a time $T_{W1}$, the intensity is reduced to an intensity $P_{W2}$ lower than $P_{W1}$ to form a mark on the optical recording medium, an apparatus for determining a prepulse condition for optical recording, comprising: a calculation unit for calculating the respective values as a combination for satisfying formula (1); and an output unit for outputting the values calculated by the calculation unit.

According to the 22nd aspect of the invention, there is provided in an apparatus for determining a condition for an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{W2}$ lower than $P_{W1}$ to form a mark on the optical recording medium, thereafter, the intensity is reduced to an intensity $P_{LB}$ lower than $P_{pre}$, and after an lapse of a time $T_{off}$, the intensity is raised to $P_{pre}$, an apparatus for determining a prepulse condition and a heat shut off condition for optical recording, comprising: a first calculation unit for calculating $P_{W2}$, which allows the medium temperature at a peak temperature position or a spot center position of the laser beam radiated onto the medium surface after an elapse of the time $T_{W1}$ to become constant even after the intensity is reduced to $P_{W2}$; a second calculation unit for calculating a combination of $P_{pre}$, $T_{off}$ and $P_{LB}$, which combination establishes the pre-heat condition within a time period until the intensity is raised to $P_{W1}$ again so as to form the next mark; and an output unit for outputting values calculated by the calculation units.

According to the 23rd aspect of the invention, there is provided in an apparatus for determining a condition for an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{W2}$ lower than $P_{W1}$ to form a mark on the optical recording medium, thereafter, the intensity is reduced to an intensity $P_{LB}$ lower than $P_{pre}$, and after an lapse of a time $T_{off}$, the intensity is raised to $P_{pre}$, an apparatus for determining a prepulse condition and a heat shut off condition for optical recording, comprising: a calculation unit for calculating the respective values as a combination for satisfying formulas (1) and (2); and an output unit for outputting the values calculated by the calculation unit.

According to the 24th aspect of the invention, the intensity $P_{LB}$ is set to be zero in the apparatus according to the 22nd or 23rd aspect of the invention.

According to the 25th aspect of the invention, the time $T_{off}$ is set to be equal to or close to a value m/n times (m and n are natural numbers) of a write clock period T in the apparatus according to the 22nd or 23rd aspect of the invention.

The general principle of the above-described methods and apparatuses will be described hereinafter.

The thermal time constant $\tau$ will be explained below.

Figure 2:
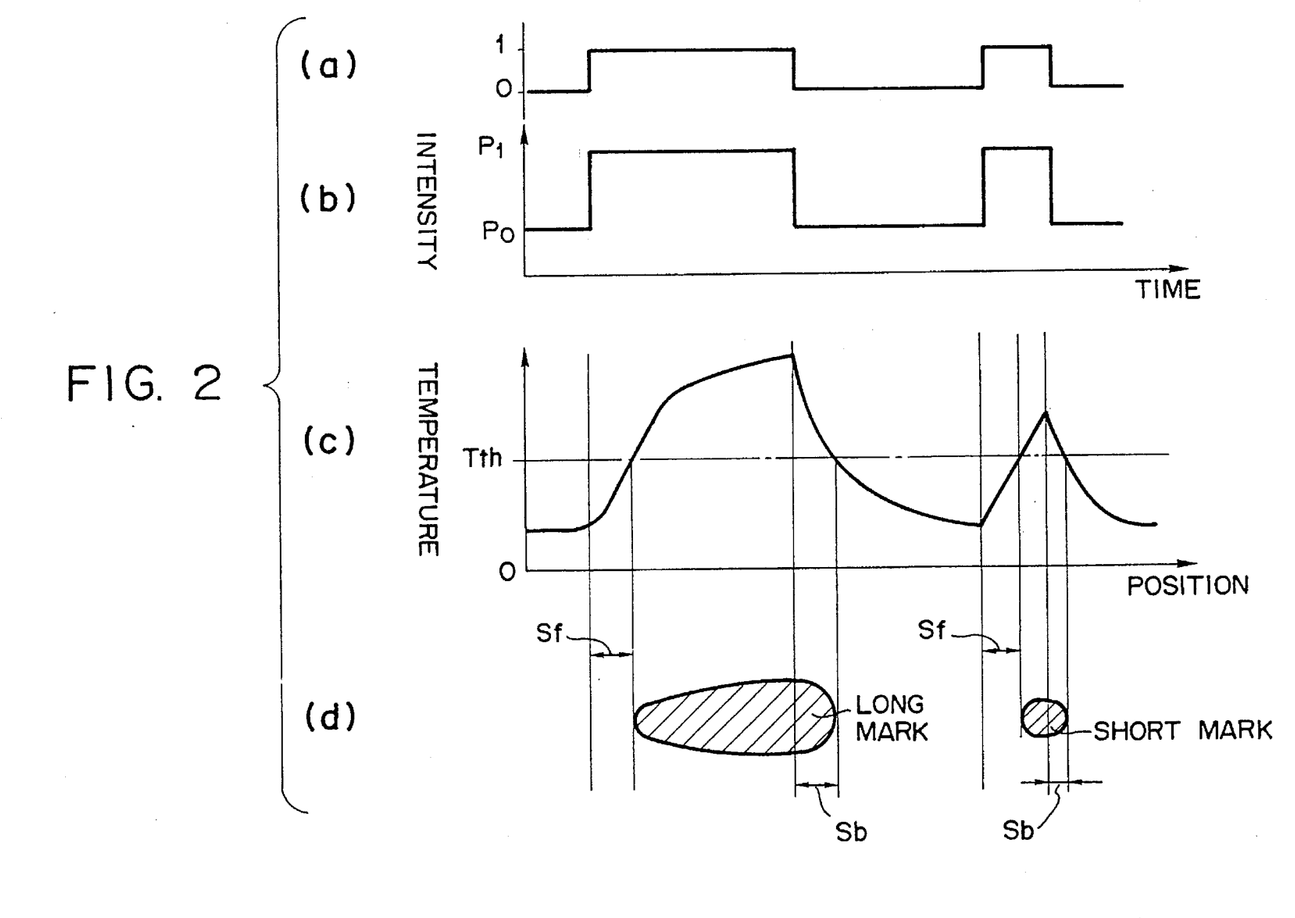
FIGS. 2(a)–2(d) include an example of a pattern (waveform) of a data signal to be recorded, a chart (a chart of electric power to be input to a laser source) showing a light-emission intensity $P_1$ and a light-off intensity $P_0$ of the laser beam at that time, a temperature profile (elevated temperature profile) of the disk at that time, and an explanatory view showing the relationship of marks to be formed.

(a) to (d) in FIG. 2 are respectively an example ((a) in FIG. 2) of a pattern (waveform) of a data signal to be recorded, a chart (a chart of electric power to be input to a laser source) ((b) in FIG. 2) showing a light-emission intensity and a light-off intensity of the laser beam at that time, a temperature profile (elevated temperature profile) ((c) in FIG. 2) of the disk at that time, and an explanatory view ((d) in FIG. 2) showing the relationship of marks to be formed.

When optical recording is performed on an optical disk using a recording laser beam (pulse), optical disks are classified into two types, i.e., heat-insulation disks and heat-diffusion disks in terms of heat diffusion. Assume that a laser beam is raised from the light-off intensity to the light-emission intensity in a step-function pattern (like a rectangular wave), as shown in (b) in FIG. 2, in accordance with a data signal ((a) in FIG. 2). Since the heat-insulation disk tends to accumulate heat as compared to the heat-diffusion disk, a temperature elevation [°C./mW] per unit intensity of the laser beam, i.e., A in formula (3) is large. More specifically, when the laser beam is radiated at the same intensity for a long period of time, the temperature saturation level of the heat-insulation disk is higher than that of the heat-diffusion disk.

Figure 3:
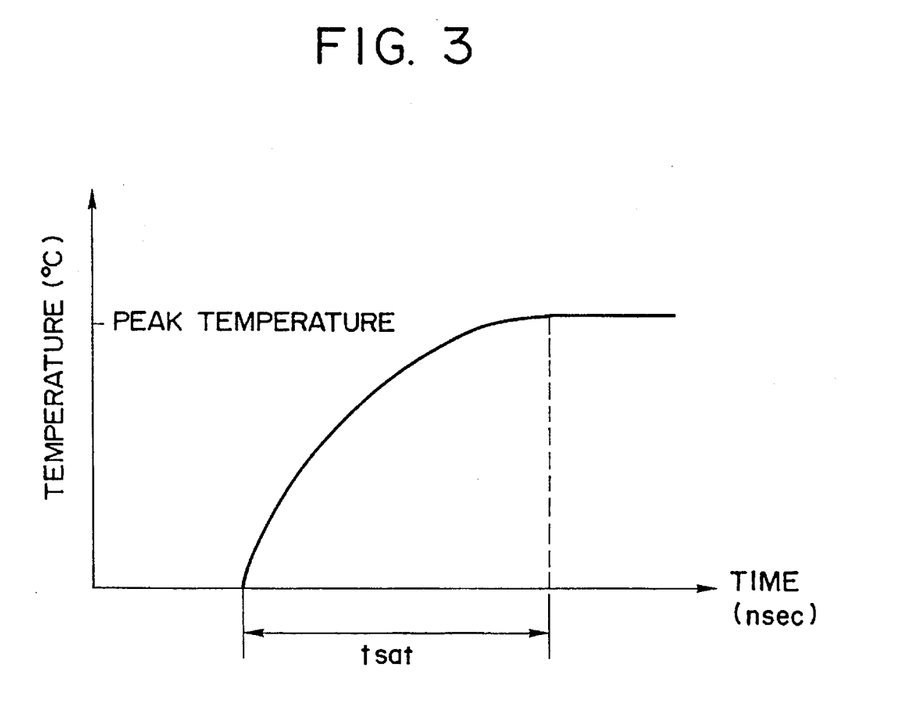
FIG. 3 is a graph of the temperature profile showing a time ($t_{sat}$) required until the temperature is saturated.

On the other hand, the heat-insulation disk requires a longer time until the instantaneous (elevated) temperature profile or temperature profile is saturated than that of the heat-diffusion disk. FIG. 3 is a graph showing the temperature profile showing a time ($t_{sat}$) required until the temperature is saturated. More specifically, the heat-insulation disk has longer $t_{sat}$ in FIG. 3 than that of the heat-diffusion disk. This can be easily understood from the fact that an earthen teapot is harder to warm up and to cool down than an iron kettle is. The thermal time constant $\tau$ corresponds to $t_{sat}$. More specifically, a disk having long $t_{sat}$ has large $\tau$.

One of the present inventors made extensive studies, and invented a method of measuring the thermal time constant of a disk by measuring an optical disk itself in advance. This measurement method will be explained below.

<Thermal Time Constant Measurement Method>

An optical disk to be measured, and an optical recording/reproduction apparatus for evaluating an optical disk (to be also referred to as an evaluation drive hereinafter) are prepared. A laser beam has N.A.=0.55, and a wavelength= 830 nm, and both the rising and falling times of the laser beam are about 5 nsec. The optical disk is set on the evaluation drive, and is rotated so that the track of the disk has a measurement linear velocity (V=11.3 m/sec). The laser beam spot of the evaluation drive is radiated on the track under the servo control. More specifically, focusing and tracking servo devices are operated. Then, the laser beam is pulse-modulated. Upon radiation of the laser beam, the disk temperature is elevated. In this case, pulse modulation is performed to have a duty cycle, which can assure a time interval long enough not to cause interference of heat generated by heating of pulses. Pulses having various pulse duration times (to be abbreviated as P.D.T. hereinafter) are radiated onto the disk, and a "minimum power ($P_{th}$) capable of performing recording on the disk" of each P.D.T. is obtained.

Figure 4:
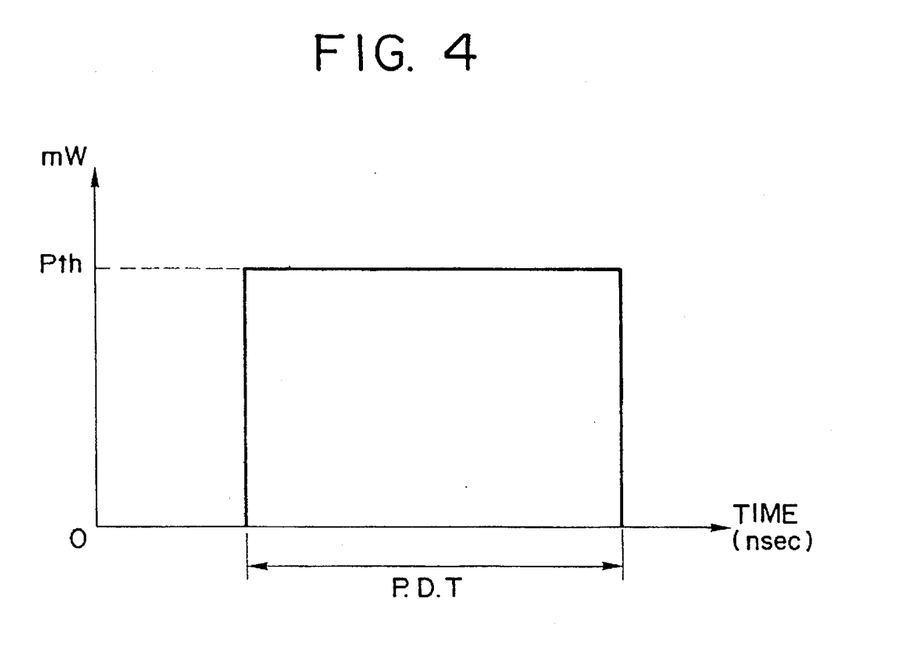
FIG. 4 is a waveform chart for explaining pulse duration time (P.D.T.)
Figure 5:
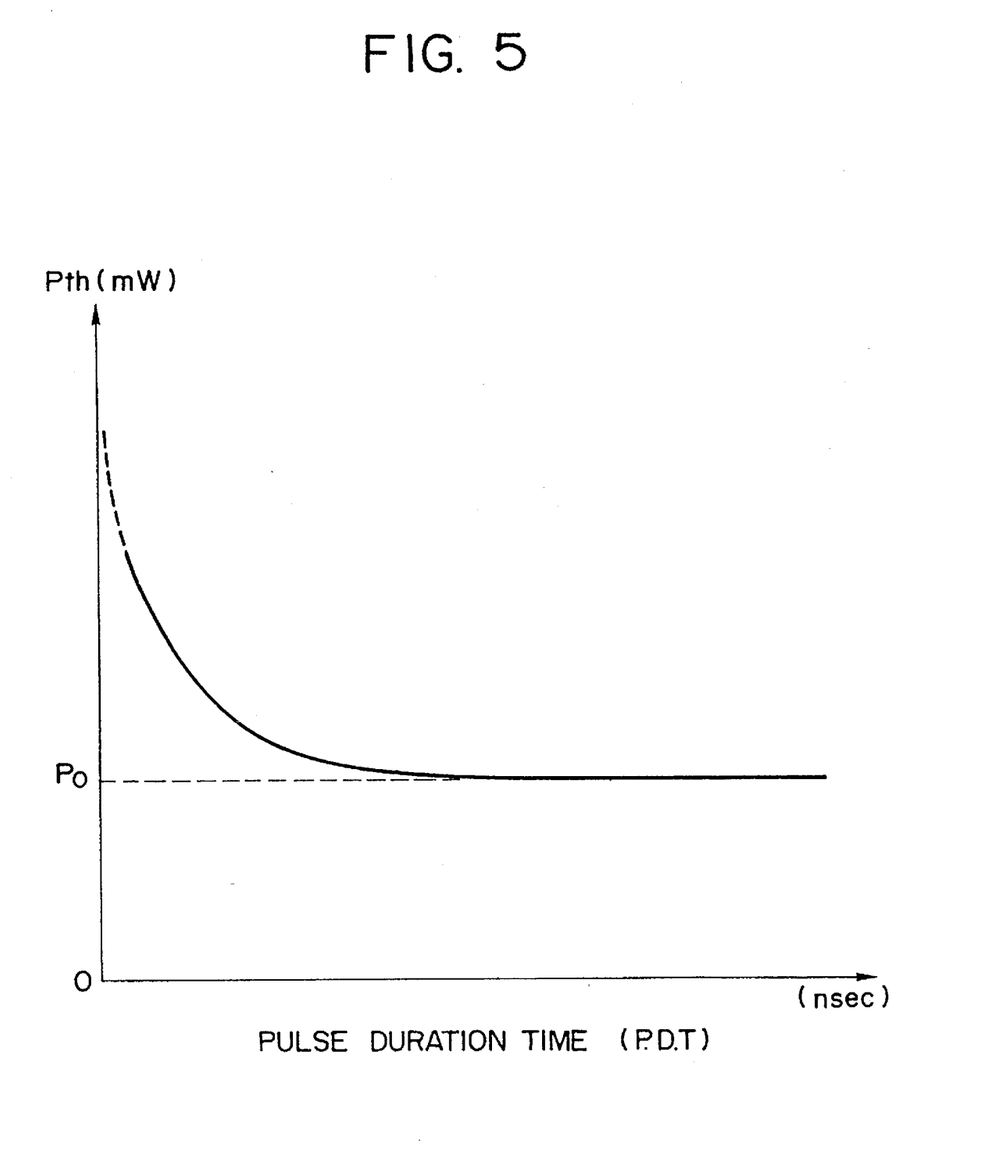
FIG. 5 is a graph wherein data are plotted while the ordinate represents $P_{th}$, and the abscissa represents P.D.T.

FIG. 4 is a waveform chart for explaining the P.D.T. FIG. 4 shows that a laser beam pulse is radiated on the disk with the "minimum power ($P_{th}$) capable of performing recording on the disk". FIG. 5 is a graph wherein data are plotted while the ordinate represents $P_{th}$, and the abscissa represents P.D.T. As shown in FIG. 5, $P_{th}$ decreases as P.D.T. is prolonged, and converges to a predetermined level $P_0$ after P.D.T reaches a certain value.

Figure 6:
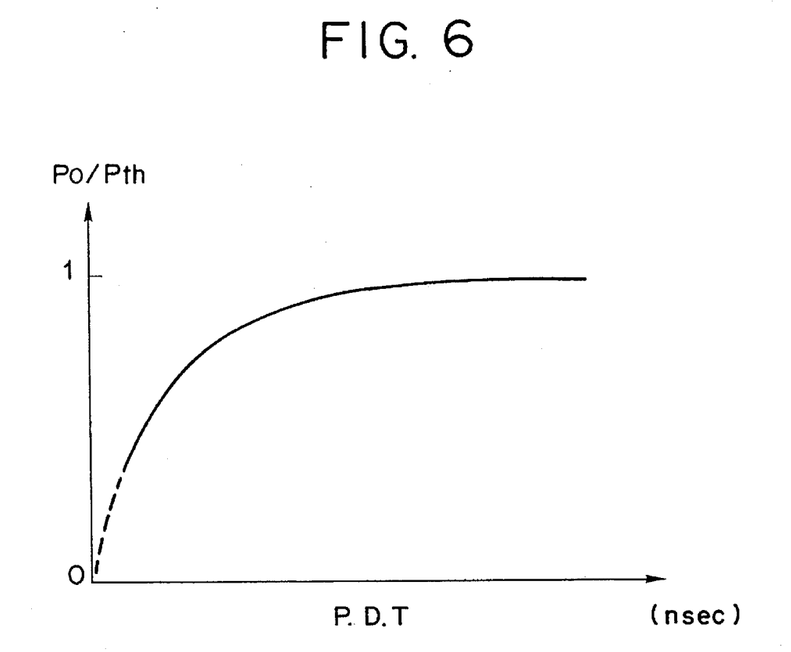
FIG. 6 is a graph wherein data are plotted while the ordinate represents $P_0/P_{th}$, and the abscissa represents P.D.T. (showing the elevated temperature profile of the disk)
Figure 7:
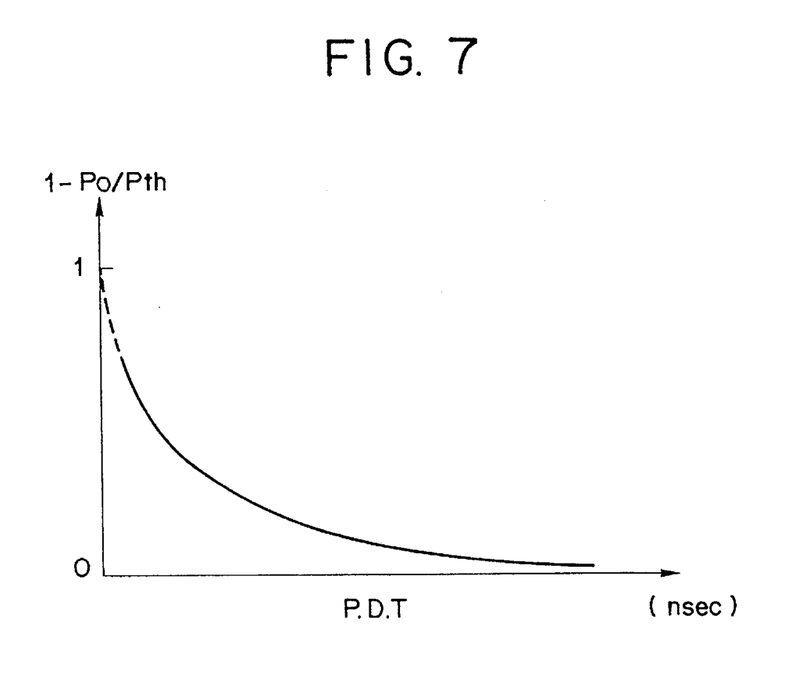
FIG. 7 is a graph wherein data are plotted while the ordinate represents $1-P_0/P_{th}$, and the abscissa represents P.D.T. (showing the decreased temperature profile of the disk)

Then, as shown in FIG. 6, data are plotted while the ordinate represents a reciprocal number of a value obtained by normalizing $P_{th}$ with $P_0$, i.e., $P_0/P_{th}$, and the abscissa represents P.D.T. This graph represents a thermal response function in an elevated temperature state obtained when the laser beam is radiated onto the disk. Also, as shown in FIG. 7, when the ordinate represents $1-P_0/P_{th}$, the graph represents a thermal response function in a decreased temperature state obtained when the laser beam is turned off. When the thermal response function shown in FIG. 7 can be approximated to an exponential function $\exp(-t/\tau)$, $\tau$ represents the thermal time constant of the temperature elevation/decrease by the measured laser beam, of the measured optical disk at the measured linear velocity (V).

Under the conventional fixed prepulse condition, it is difficult to minimize "recording data pattern dependency of the mark trailing edge position". More specifically, a mark has a teardrop shape having a larger trailing end portion, or conversely, has a teardrop shape having a larger leading end portion. However, when a prepulse condition determined by substituting $\tau$ in formula (1) according to the present invention is used, the dependency can be minimized independently of the mark length, and the mark width can be constant as well. More specifically, the method of the present invention is very effective for an analog recording method using an arbitrary mark length. This fact was found for the first time by the present inventors. When the dependency decreases, high-density recording can be precisely performed.

The pulse train condition given by formula (1) can be applied to only a case wherein the thermal response characteristics of a disk can be approximated by a simple exponential function $\exp(-t/\tau)$. When the thermal response characteristics cannot be approximated by a simple exponential function, the thermal response function is assumed as a function f(t) of time, and is considered as follows.

If we let t=0 be time after the intensity level $P_{W1}$ is maintained for the time $T_{W1}$, and is then reduced to $P_{LT}$, and F0 be the temperature of the disk at that time (since the temperature is proportional to the intensity of the laser beam, it will be expressed as a time function of the intensity hereinafter), F0 is given by:

$$F0 = Pb \cdot f(T_{W1}) + P_{W1} \cdot \{1 - f(T_{W1})\}$$

A disk temperature Fnx after an elapse of time t=nx (x is an arbitrary value) is given by:

$$Fnx = Pb \cdot f(T_{W1} + nx) + P_{W1} \cdot \{f(nx) - f(T_{W1} + nx)\} + P_{W2} \cdot \{1 - f(nx)\}$$

A condition for making the disk temperature constant when $P_{W2}$ is maintained is F0=F1x=F2x= . . . =Fnx. More specifically, if Fnx=F(n+1)x (n=0, 1, 2, . . . ), the following formula (4) is established:

$$Pb \cdot [f\{T_{w1} + (n+1)x\} - f(T_{w1} + nx)] +$$
$$P_{W1} \cdot [f\{(n+1)x\} - f\{T_{w1} + (n+1)x\} -$$
$$f(nx) + f(T_{w1} + nx)] - P_{W2} \cdot$$
$$[f\{(n+1)x\} - f(nx)] = 0 \quad \text{formula (4)}$$

Formula (4) cannot be solved any more. Thus, assume that f(t) satisfies the following condition:

$$f(a) \cdot f(b) = f(a+b), \quad f(a)/f(b) = f(a-b) \quad \text{formula (5)}$$

Then, formula (4) can be factorized as follows:

$$f(nx)\{f(x) - 1\}\underline{[(P_{W1} - Pb)\{+b \, 1 - f(T_{W1})\} - (P_{W2} - Pb)]} = 0 \quad \text{formula (6)}$$

It is apparent that f(x)−1≠0 is satisfied. Therefore, if the underlined portion in formula (6) is set to be zero, a condition for establishing Fnx=F(n+1)x for an arbitrary n is determined. That is, this condition is:

$$(P_{W2} - Pb) = (P_{W1} - Pb) \cdot \{1 - f(T_{W1})\} \quad \text{formula (7)}$$

Formula (7) becomes equal to a formula obtained by assuming exp(−t/τ)=f(t) in prepulse condition formula (1).

As described above, when the thermal response function f(t) satisfies the condition given by formula (5), a condition for making the disk temperature constant when the $P_{W2}$ is maintained can be determined.

When the thermal response function f(t) does not satisfy the condition given by formula (5), since the condition for making the disk temperature constant cannot be determined, a condition for minimizing an average FA, given by the following formula, of F0 to Fnx is searched:

$$\sum_{i=0}^{n} \{(Fix - FA)^2\}$$

The present invention will be described in detail below by way of its examples. However, the present invention is not limited to these examples.

DETAILED DESCRIPTION OF THE PREFERRED EMBODIMENTS

[EXAMPLE 1]

Figure 1:
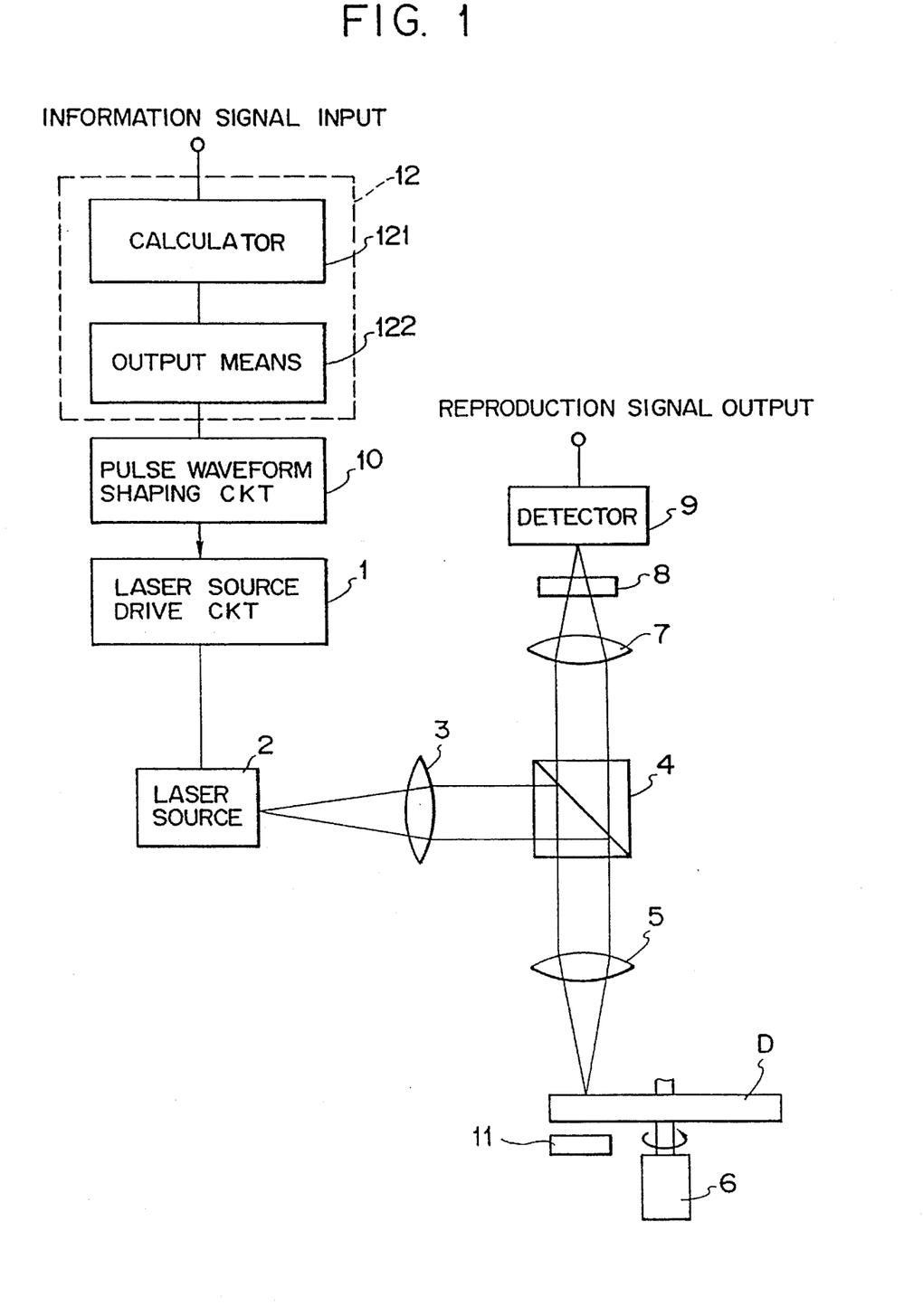
FIG. 1 is a diagram showing an arrangement of main part of a magnetooptical recording apparatus according to an embodiment of the present invention.

FIG. 1 is a diagram showing an arrangement of main part of a magnetooptical recording apparatus according to an embodiment of the present invention. This apparatus also serves as a reproduction apparatus, and mainly comprises a motor (rotation means 6) for rotating a magnetooptical recording medium D, a laser source 2, a laser source drive circuit 1 for pulse-modulating the laser beam intensity between high and low levels in accordance binary data to be recorded, a recording magnetic field applying means (permanent magnet 11), a pulse waveform shaping circuit 10, and a condition determination means 12. The pulse waveform shaping circuit 10 shapes the pulse waveform into a waveform shown in FIG. 11.

The condition determination means 12 comprises a calculation unit 121 for determining a combination of respective values ($P_{pre}$, $P_{W1}$, $P_{W2}$, $P_{LB}$, $T_{W1}$, and $T_{off}$) on the basis of formulas (1) and (2), and an output unit 122 for outputting the determined values. The calculation unit determines the respective values based on formulas (1) and (2). The determined values are output from the output unit. The pulse waveform shaping circuit 10 shapes a pulse waveform on the basis of the output values.

As the medium D, a magnetooptical disk is set. The medium D is rotated by the rotation means 6, so that the linear velocity of tracks on the medium D has a predetermined value. A laser beam spot from the laser source 2 is radiated on a track under the servo control. That is, focusing and tracking servo devices (not shown) are operated. The laser beam emitted from the laser source 2 is pulse-modulated by the laser source drive circuit 1 in accordance with binary data to be recorded. The beam emitted from the laser source 2 is collimated via a collimator lens 3, and is reflected by a beam splitter 4. The reflected beam is focused by an objective lens 5, and forms a focal point on the medium D. Recording is thus basically completed.

In a reproduction mode, a DC-ON laser beam, which is not intensity-modulated, is radiated onto the medium D in the same manner as in a recording mode. Light reflected by the medium is caused to become incident on the beam splitter 4 via the objective lens 5. Light transmitted through the beam splitter 4 is focused by a focusing lens 7, and is caused to become incident on a detector 9. The state of rotation of the plane of polarization is converted into a change in light intensity via an analyzer 8 (polarizer) arranged between the focusing lens 7 and the detector 9. Thus, data recorded on the medium D, which is read as rotation of the plane of polarization, is converted into a change in light intensity. The change in light intensity is converted into electrical signal levels by the detector 9. This is the reproduction process.

In the above-mentioned apparatus, a magnetooptical disk having $\tau=55$ nsec (V=11.3 m/sec) measured by the above-mentioned measurement method of $\tau$ was prepared as the medium D. After the entire surface of the disk was initialized, the magnetooptical disk was rotated at a measurement linear velocity V=11.3 m/sec, and an NRZI mark length recording random signal of ⅔ one seven R.L.L., 0.56 μm/bit, T (write clock period)=33 nsec was recorded on the disk by the digital recording method using a recording/reproduction laser beam, which had N.A.=0.55, a wavelength=830 nm, and laser pulse rising and falling times of about 5 nsec. As a pulse waveform, the prepulse method and the heat shut off method, as shown in FIG. 11, were adopted. The number of types of marks was 7, i.e., 2T to 8T marks. An nT mark is a mark with which the width of a reproduction pulse becomes n times (e.g., twice for the 2T mark) of the clock period T when the recorded mark is reproduced.

<Condition 1>

$\tau=55$ nsec, $P_{LB}=0$ mW, $P_{pre}=3.0$ mW, $P_{W1}=11.0$ mW, T=33 nsec, $T_{W1}=50$ nsec (=T×3/2), $T_{off}=52$ nsec (this value was calculated by substituting the above-mentioned numerical values in formula (2)), and $P_{W2}=7.8$ mW (this value was calculated by substituting the above-mentioned numerical values in formula (1)).

Thereafter, recorded data were reproduced at a reproduction laser beam intensity $P_r=1.5$ mW, and "recording data pattern dependency of the mark trailing edge position" was measured. As a result, the dependency was small, and data identifiability was satisfactory. Also, the mark width was almost constant.

[COMPARATIVE EXAMPLE 1]

Data were recorded and reproduced under substantially the same conditions as in Example 1, except that $P_{W2}=8.8$ mW (this value was popularly used based on experience, and corresponded to a value about 80% of $P_{W1}$). As a result, as compared to the trailing edge position of a 2T mark, the trailing edge positions of 3T to 8T marks were shifted backward by a maximum of about 1 nsec. In other words, the "recording data pattern dependency of the mark trailing edge position" still remained.

[EXAMPLE 2]

A magnetooptical disk having $\tau=55$ nsec (V=11.3 m/sec) measured by the above-mentioned measurement method of $\tau$ was prepared. After the entire surface of the disk was initialized, the magnetooptical disk was rotated at a measurement linear velocity V=11.3 m/sec, and an ITE (Institute of Television Engineers of Japan) was recorded by the analog recording method using a recording/reproduction laser beam, which had N.A.=0.55, a wavelength=830 nm, and laser pulse rising and falling times of about 5 nsec. As a pulse waveform, the prepulse method and the heat shut off method, as shown in FIG. 11, were adopted.

<Condition 2>

$\tau=55$ nsec, $P_{LB}=0$ mW, $P_{pre}=3.0$ mW, $P_{W1}=11.0$ mW, $T_{W1}=50$ nsec, $T_{off}=52$ nsec (this value was calculated by substituting the above-mentioned numerical values in formula (2)), and $P_{W2}=7.8$ mW (this value was calculated by substituting the above-mentioned numerical values in formula (1)).

Thereafter, recorded data were reproduced at a reproduction laser beam intensity $P_r=1.5$ mW, and "recording data pattern dependency of the mark trailing edge position" was measured. As a result, the dependency fell within a range of a measurement error, and was not measured. Also, the mark width was almost constant.

[COMPARATIVE EXAMPLE 2]

Data were recorded and reproduced under substantially the same conditions as in Example 2, except that $P_{W2}=8.8$ mW (this value was popularly used based on experience, and corresponded to a value about 80% of $P_{W1}$). As a result, the recorded mark had a teardrop shape having a larger trailing end portion. Especially, as the mark length was increased, the influence became more serious and the trailing edge position of the mark was shifted backward by a maximum of about 2 nsec from a predetermined position. In other words, the "recording data pattern dependency of the mark trailing edge position" still remained.

As described above, according to the present invention, since a prepulse condition optimal for an optical disk can be determined, when optical recording is performed using this condition, "recording data pattern dependency of the mark formation end position, i.e., the mark trailing edge position" for every optical disk can always be eliminated. The mark shape can have an almost constant width in place of a teardrop shape. As a result, high-density recording can be precisely performed all the time.

What is claimed is:

1. In an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{W2}$ lower than $P_{W1}$ to form a mark on said optical recording medium, thereafter, the intensity is reduced to an intensity $P_{LB}$ lower than $P_{pre}$, and after an lapse of a time $T_{off}$, the intensity is raised to $P_{pre}$, the improvement characterized in that $P_{W2}$ is controlled so that the medium temperature at a peak temperature position or a spot center position of the laser beam radiated onto the medium surface after an elapse of the time $T_{W1}$ remains constant even after the intensity is reduced to $P_{W2}$, and at least one of $P_{pre}$, $T_{off}$, and $P_{LB}$ is controlled to establish the pre-heat condition within a time period until the intensity is raised to $P_{W1}$ again so as to form the next mark.

2. A method according to claim 1, wherein thermal response characteristics of the optical recording medium are approximated by an exponential function.

3. A method according to claim 1, wherein the intensity $P_{LB}$ is set to be zero.

4. A method according to claim 1, wherein the time $T_{off}$ is set to be equal to or close to a value m/n times (m and n are natural numbers) of a write clock period T.

5. An optical recording apparatus comprising:

a laser source for emitting a laser beam;

radiation means for radiating the laser beam onto an optical recording medium;

moving means for changing a radiation position of the laser beam on said recording medium;

first modulation means for raising an intensity of the laser beam to be radiated onto said optical recording medium from an intensity $P_{pre}$ for maintaining a pre-heat state, in which a temperature of the medium surface becomes a predetermined temperature, to an intensity $P_{W1}$ higher than $P_{pre}$, and reducing the intensity to an intensity $P_{W2}$ lower than $P_{W1}$ after $P_{W1}$ is maintained for a time $T_{W1}$ so as to form a mark;

second modulation means for reducing the intensity to an intensity $P_{LB}$ lower than $P_{pre}$ after the mark is formed on said optical recording medium, and raising the intensity to $P_{pre}$ after an elapse of a time $T_{off}$;

first control means for controlling $P_{W2}$ so that the medium temperature at a peak temperature position or a spot center position of the laser beam radiated onto the medium surface after an elapse of the time $T_{W1}$ remains constant even after the intensity is reduced to $P_{W2}$; and second control means for controlling at least one of $P_{pre}$, $T_{off}$, and $P_{LB}$ so as to establish the pre-heat state within a time period until the intensity is raised to $P_{W1}$ again so as to form the next mark.

6. A method of determining a prepulse condition and a heat shut off condition for an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{W2}$ lower than $P_{W1}$ to form a mark on said optical recording medium, thereafter, the intensity is reduced to an intensity $P_{LB}$ lower than $P_{pre}$, and after an lapse of a time $T_{off}$, the intensity is raised to $P_{pre}$, comprising the steps of:

setting $P_{W2}$ so that the medium temperature at a peak temperature position or a spot center position of the laser beam radiated onto the medium surface after an elapse of the time $T_{W1}$ remains constant even after the intensity is reduced to $P_{W2}$; and determining a combination of $P_{pre}$, $T_{off}$, and $P_{LB}$, which combination establishes the pre-heat condition within a time period until the intensity is raised to $P_{W1}$ again so as to form the next mark.

7. A method according to claim 6, wherein the intensity $P_{LB}$ is set to be zero.

8. A method according to claim 6, wherein the time $T_{off}$ is set to be equal to or close to a value m/n times (m and n are natural numbers) of a write clock period T.

9. An apparatus for determining a prepulse condition and a heat shut off condition for an optical recording method in which an intensity of a laser beam to be radiated onto an optical recording medium is raised from an intensity $P_{pre}$ for maintaining a pre-heat state, in which a temperature of the medium surface becomes a predetermined temperature, to an intensity $P_{W1}$ higher than $P_{pre}$, after $P_{W1}$ is maintained for a time $T_{W1}$, the intensity is reduced to an intensity $P_{W2}$ lower than $P_{W1}$ to form a mark on said optical recording medium, thereafter, the intensity is reduced to an intensity $P_{LB}$ lower than $P_{pre}$, and after an lapse of a time $T_{off}$, the intensity is raised to $P_{pre}$, comprising:

a first calculation unit for calculating $P_{W2}$, which allows the medium temperature at a peak temperature position or a spot center position of the laser beam radiated onto the medium surface after an elapse of the time $T_{W1}$ to remains constant even after the intensity is reduced to $P_{W2}$;

a second calculation unit for calculating a combination of $P_{pre}$, $T_{off}$, and $P_{LB}$, which combination establishes the pre-heat condition within a time period until the intensity is raised to $P_{W1}$ again so as to form the next mark; and an output unit for outputting values calculated by said first and second calculation units.

10. An apparatus according to claim 9, wherein the intensity $P_{LB}$ is set to be zero.

11. An apparatus according to claim 9, wherein the time $T_{off}$ is set to be equal to or close to a value m/n times (m and n are natural numbers) of a write clock period T.

* * * * *